H. A. FRUIN.
SAW SWAGE.
APPLICATION FILED JUNE 1, 1911.
1,069,687.
Patented Aug. 12, 1913.
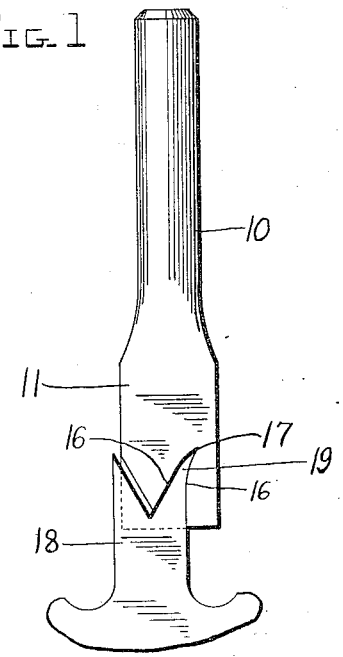
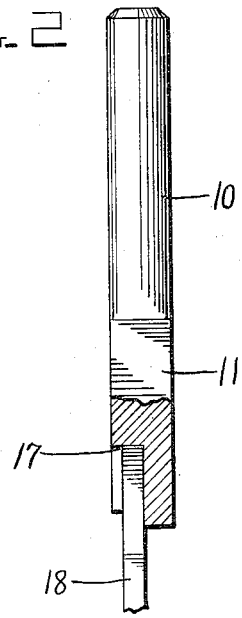
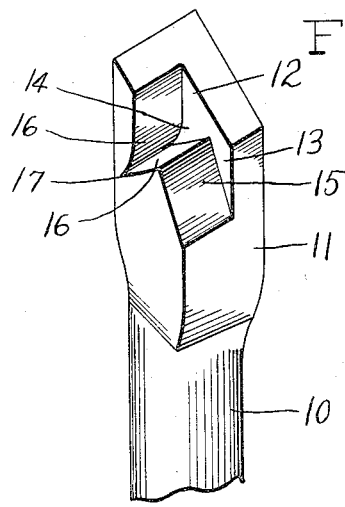
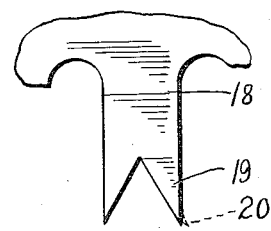
Witnesses
J. W. England
Francis Boyle
Inventor
H. A. Fruin.
By Chandler & Chandler
Attorneys

UNITED STATES PATENT OFFICE.

HARRY A. FRUIN, OF PORT LEYDEN, NEW YORK.

SAW-SWAGE.

1,069,687. Specification of Letters Patent. Patented Aug. 12, 1913.

Application filed June 1, 1911. Serial No. 630,607.

*To all whom it may concern:*

Be it known that I, HARRY A. FRUIN, a citizen of the United States, residing at Port Leyden, in the county of Lewis, State of New York, have invented certain new and useful Improvements in Saw-Swages; and I do hereby declare the following to be a full, clear, and exact description of the invention, such as will enable others skilled in the art to which it appertains to make and use the same.

This invention relates to saw swages and has for an object to provide a saw swage which will impart forward curvature to the tip of a tooth so that the latter acts as the forwardly inclined blade of a plane in cutting.

A further object of the invention is to provide a simple saw swage which will support and impart the forward curvature to teeth of various magnitudes.

A still further object is to provide a saw swage which will securely support the saw while the former is being struck with a hammer or like tool for driving the tooth into the curvature forming recess of the swage.

With the above objects in view the invention consists in certain novel details of construction and combination of parts hereinafter fully described and claimed, it being understood that various modifications may be made in the minor details of construction within the scope of the appended claim.

In the accompanying drawing forming part of this specification:—Figure 1 is a side elevation of the swage with a saw tooth shown therein and having its tip conforming to the curvature of the swage orifice. Fig. 2 is an end elevation with parts broken away. Fig. 3 is a detail perspective view of the swage. Fig. 4 is a side elevation of a saw tooth shown in full lines in its normal shape and having one of its tips dotted in the position imparted to it by the swage.

Referring now to the drawings in which like characters of reference designate similar parts, the swage is shown to comprise a stem or handle 10 on one end of which is a substantially oblong head 11. Formed in one side of the head is a recess 12, which opens both through the end edge and the working face of the swage and is formed with two branches 13 and 14, the inner walls 15 of which diverge. The walls 16 of one of the branches converge, and at their meeting end portions are curved in the same direction as shown at 17.

The device above described is designed to be made of metal, and in operation, a saw tooth 18 is inserted in the recess so that the points of the teeth straddle the inner walls 16 of the recess. The swage is now struck with a hammer or similar tool and during this striking operation, the point 19 of the tooth which is disposed in the branch of the recess having the curved converging walls, is directed by said walls to form a forwardly curved tip on the tooth as clearly shown in dotted lines at 20 in Fig. 4. This forwardly curved tip, during the operation of the saw, acts as the cutting blade of a plane so that the cut made by the saw is smoother and is made with less manual exertion than with saws of ordinary construction.

What is claimed, is:—

A saw swage for saws having lance teeth each comprising a shank terminating in two points, said swage including a stem, and an anvil carried by said stem, said anvil being formed with a branched recess in one side face adapted to receive both points and a portion of the shank of a lance tooth, said recess having an inner flat stop wall adapted to contact intimately with said points and said shank, one of the branches of said recess terminating in a swaging extension.

In testimony whereof, I affix my signature, in presence of two witnesses.

HARRY A. FRUIN.

Witnesses:
 RAY HANFLIN,
 THOMAS VAN ALSTINE.

Copies of this patent may be obtained for five cents each, by addressing the "Commissioner of Patents, Washington, D. C."